United States Patent [19]
Cunkelman

[11] Patent Number: 6,128,825
[45] Date of Patent: Oct. 10, 2000

[54] COMBINATION MAIN RESERVOIR AND GAS DRYING APPARATUS

[75] Inventor: Brian L. Cunkelman, Blairsville, Pa.

[73] Assignee: Westinghouse Air Brake Company, Wilmerding, Pa.

[21] Appl. No.: 08/989,456

[22] Filed: Dec. 12, 1997

[51] Int. Cl.[7] .................................................. B01D 53/22
[52] U.S. Cl. ......................................... 34/79; 96/8; 95/52
[58] Field of Search .................................. 34/72, 79, 80, 34/84; 96/4, 7, 8, 10; 95/52

[56] References Cited

U.S. PATENT DOCUMENTS

| | | | |
|---|---|---|---|
| 5,013,331 | 5/1991 | Edwards et al. | 55/16 |
| 5,015,269 | 5/1991 | Garrett et al. | 55/16 |
| 5,059,374 | 10/1991 | Krueger et al. | 204/156 |
| 5,681,368 | 10/1997 | Rahimzadeh | 95/19 |

*Primary Examiner*—Pamela A. Wilson
*Attorney, Agent, or Firm*—James Ray & Associates

[57] ABSTRACT

A combination gas drying and reservoir apparatus includes a reservoir, a membrane dryer disposed inside the reservoir and a control scheme that reduces the amount of gas lost as sweep gas from the dryer. The reservoir has an inlet flange that receives moisture laden gas from a compressor, an outlet flange from which dried gas discharges to a pneumatic system and a purge flange. The dryer includes a vessel encasing a membrane unit between its inlet and outlet ends. A purge port of the vessel communicates with the purge flange to form a purge channel. The inlet end of the vessel is connected to the inlet flange from which it receives the moisture laden gas. The moisture laden gas then flows into the membrane unit. Sweep gas that has permeated through membranes flows from a sweep space defined between the vessel and the membrane unit to the purge channel. Dried gas flows out of the membrane unit through the outlet end of the vessel into the reservoir. The control scheme includes a purge valve and a mechanism for controlling the purge valve. Connected to the purge flange, the purge valve can be closed to prevent sweep gas from exhausting via the purge channel to atmosphere. When the compressor is unloaded, the mechanism closes the purge valve thereby preventing sweep gas from expelling into the atmosphere. When the compressor is loaded, the mechanism opens the purge valve thereby allowing sweep gas to exhaust into the atmosphere via the purge channel of the apparatus.

12 Claims, 4 Drawing Sheets

COMBINATION MAIN RESERVOIR AND GAS DRYING APPARATUS

CROSS-REFERENCE TO RELATED APPLICATIONS

This application is related to a copending application for patent U.S. Ser. No. 09/178,460, entitled Membrane Type Air Dryer With Control Scheme To Reduce Air Lost As Sweep Air, filed Oct. 23, 1998. This copending application is assigned to the assignee of the present invention, and its teachings are incorporated into the present document by reference.

FIELD OF THE INVENTION

The present invention generally relates to gas dryers of the type that use semipermeable membranes to remove moisture from gas in which the moisture is suspended. More particularly, the invention relates to incorporating a membrane type air dryer into an air drying system on a railroad locomotive without occupying a large amount of space.

BACKGROUND OF THE INVENTION

It is well known in the air drying art that the amount of moisture suspended in any given volume of air is dependent on both the pressure and temperature of the air contained in that volume. This relationship between pressure, volume and temperature is defined by the various ideal gas laws of thermodynamics. When a quantity of air is compressed by reducing the volume it occupies, the amount of moisture that the compressed air can hold is reduced accordingly, assuming its temperature is held constant. The temperature of air, however, increases as the air is compressed, and this temperature increase enables the air to hold its moisture.

In most compressed air systems, such as those used in the railroad industry, temperature increases are undesirable. This is because the compressed air system has components downstream whose temperatures may be lower than that of the incoming moisture-laden compressed air. The moisture in such moisture-laden air tends to condense on the surfaces of these downstream components and contaminates the compressed air system and the pneumatic components that it supplies. Consequently, an aftercooler is typically inserted between the output of the compressor and the intake port of the air drying system to lower the temperature of the incoming compressed air. By lowering the temperature, the aftercooler causes some of the water vapor suspended in the air to precipitate out of the air in the form of liquid condensate. This liquid condensate is usually removed from the air drying system via well known devices such as separating chambers and coalescing elements. Despite the use of aftercoolers, separating chambers and coalescing elements, the compressed air will still hold some water vapor as it is difficult to remove this remaining moisture solely by mechanical means. They are therefore often used in conjunction with one of the known air drying methods to remove this remaining water vapor. Depending on the specific application and environment in which it is used, an air drying method may be used alone, without the aforementioned mechanical means.

There are at least three prior art methods of drying air that are commonly used to remove water vapor. (1) Absorbent type air dryers use deliquescent desiccant that becomes liquid by absorbing moisture suspended in the air. Deliquescent air dryers typically have no moving parts and their costs are initially low. These dryers, however, exhibit limited dew point suppression—20° to 30° F. is common. They also require considerable maintenance, e.g., the desiccant must be periodically replaced and the system manually drained on a regular basis. (2) Adsorbent type air dryers use regenerative desiccant that temporarily adsorbs moisture on the surface of its molecules. The moisture temporarily accumulated by the desiccant is later removed via a stream of dried air redirected through the desiccant to purge the moisture into the atmosphere. Regenerative dryers are able to achieve low dew points, but impose high costs initially and high operating costs thereafter. Their desiccant towers, in which the desiccant is housed, also must be serviced periodically. (3) Refrigeration type air dryers typically require low maintenance and impose low operating costs, but are not able to achieve low dew points. Dew points are typically limited to approximately 38° F. as a minimum to prevent freeze ups. Refrigeration type dryers are used in many industries as a first step in a multi-step drying system, e.g., before drying the air in desiccant type air dryer.

Another method of drying air employs the use of semipermeable membranes to remove moisture from the air in which the moisture is suspended. These membrane type air dryers have long been used in various industries. Such membrane type air dryers typically feature a membrane fiber bundle and a containment vessel or shell in which the bundle is housed. The membrane fiber bundle is of a type that is commercially available from Bend Research, Inc. of Bend, Oreg., U.S.A.

Regarding basic operation of a membrane type air dryer, air passes through each membrane in the bundle by a combination of (i) diffusion through the pores linking the respective surfaces of a membrane and (ii) permeation through the material of the membrane. The force that drives the separation of water vapor from air is the difference between the pressure of the air on one side of a membrane and the pressure of air on the other side of the membrane. When air is compressed, the partial pressures of the various constituents in the air each increase. Water vapor, of course, is present in the stream of compressed air that flows into the inlet of the membrane housing from the source of compressed air. The partial pressure of the water vapor in the air stream flowing in the bundle will be greater than that of the atmospheric air by a factor dependent upon the compression ratio of the compressor. This difference in the partial pressure of water vapor on the inside (higher) versus that on the outside (lower) of the membranes drives the water vapor through the membranes into the sweep air space defined between the outside of the bundle and the inner wall of the containment vessel.

The vessel in which the membrane fiber bundle is encased also features a purge hole that communicates with the sweep air space. The sweep air space serves as the conduit to transport the water vapor that has permeated through the membranes to the purge hole. It is through this purge hole that the permeated water vapor is forcibly purged from the sweep air space by "sweep air". The air stream flowing through the fiber bundle causes pressure to build within its membranes. The "sweep air" that is used to purge the permeated water vapor from the vessel originates within these pressurized membranes. Composed of light gases including even hydrogen and helium that are capable of penetrating the membranes, the sweep air leaks out of the membranes and forcibly carries with it the permeated water vapor out the purge hole in the bottom of the vessel. It is for this reason that the vessel is often referred to as the sweep air containment vessel. The dried non-permeate air that emerges from the outlet of the membrane housing, of course, flows into whatever pneumatic component(s) that the membrane air dryer is intended to supply.

The membrane type air dryer is typically incorporated within a compressed air system between the source of compressed air and a pneumatic component to which it supplies the compressed dried air. As shown in FIG. 1, a check valve is commonly installed downstream of the outlet of the dryer to prevent air from flowing back into the dryer when the source of compressed air is unloaded (i.e., turned off). When the source of compressed air is loaded, the compressed air that flows through the fiber bundle will cause pressure to build within the membranes as described previously. It is this pressure that is the source of the sweep air. When the source of compressed air is unloaded, however, the pressure that has accumulated within the membranes is largely lost as sweep air as it is continuously vented from the purge hole of the vessel.

It is well known that a railroad locomotive includes at least one main reservoir for storing the relatively large quantity of compressed air that is needed to operate the pneumatic components on the locomotive. As shown in FIG. 2, moisture laden air flows from a compressor to the first main reservoir via a rather long cooling pipe. The lower temperature of the pipe causes some of the water vapor suspended in the air to precipitate out in the form of liquid condensate. This liquid condensate is flushed by the incoming air stream into the main reservoir. Most of the condensate is removed from the reservoir via a drain valve that is opened on a periodic basis. The air stream continues, eventually flowing into the regenerative air dryer where it is more thoroughly dried. Downstream from the first reservoir, FIG. 2 also shows a second main reservoir that normally receives dried air from the regenerative air dryer. Like the first reservoir, the second reservoir stores the air that is needed to operate the brake equipment and various other pneumatically operated components.

It is also well known that the locomotive compressor is operated so that the reservoirs are always primed so that the pneumatically operated components will always have available a sufficient quantity of compressed air to operate. Typically, the compressor will supply compressed air once every five minutes for approximately thirty seconds. If incorporated into an air system of a locomotive, a membrane type air dryer would therefore be required to operate according to this duty cycle.

There are at least two disadvantages to incorporating a membrane type air dryer into a locomotive. First, membrane type air dryers are quite large devices and space on today's locomotives is at a premium. Second, current methods used to control membrane type air dryers result in excessive loss of air as sweep air from the containment vessel when the compressor is unloaded. Regarding the latter concern, during the thirty second period when the compressor is loaded (i.e., the drying phase of the duty cycle), the compressed air that flows into the fiber bundle causes pressure to build within the membranes as described previously. When turned off during the inactive phase of its duty cycle, the compressor is unloaded for such a long time that much, if not most all, of the pressure built up within the membranes is lost as sweep air. Consequently, when again turned on for the next thirty second period, the compressor spends too much of the drying phase of its duty cycle on merely re-pressurizing the membranes of the fiber bundle.

It should be noted that the foregoing background information is provided to assist the reader in understanding the invention. Therefore, any terms used herein are not intended to be limited to any particular narrow interpretation unless specifically stated otherwise in this document.

OBJECTIVES OF THE INVENTION

It is, therefore, an objective of the invention to incorporate a membrane type air dryer into a locomotive air drying system without occupying a large amount of space.

Another objective is to incorporate the membrane type air dryer into a reservoir of a locomotive so that however much volume in the reservoir that is lost by doing so is made up for by a minor increase in the diameter of the reservoir.

Yet another objective is to provide a control system for a combination membrane air drying and reservoir apparatus that reduces the amount of air lost as sweep air by which the water vapor that has passed through the membranes of the dryer is swept away into the atmosphere.

Still another objective is to reduce the time that the compressor must take to repressurize the membranes of a membrane type air dryer during the drying phase of its duty cycle.

A further objective is to incorporate a memory feature into a membrane type air dryer that enables the dryer to resume its drying function generally with the same amount of internal air pressure that it had when the drying function was last stopped.

In addition to the objectives and advantages listed above, various other objectives and advantages of the invention will become more readily apparent to persons skilled in the relevant art from a reading of the detailed description section of this document. The other objectives and advantages will become particularly apparent when the detailed description is considered with the attached drawings and the appended claims.

SUMMARY OF THE INVENTION

In one presently preferred embodiment, the invention provides a combination air drying and reservoir apparatus for a compressed air system. The apparatus includes a reservoir, a membrane air dryer disposed inside the reservoir and a control scheme that reduces the amount of air lost as sweep air from the dryer. Used to store dried compressed air for use by the compressed air system, the reservoir has an inlet flange that receives moisture laden air ultimately from a compressor, an outlet flange from which the dried air is discharged to the compressed air system and a purge flange. Used to dry the moisture laden air, the membrane air dryer includes a vessel encasing a membrane unit disposed between its inlet and outlet ends. The vessel also has a purge port that communicates with the purge flange of the reservoir to form a purge channel. The inlet end of the vessel is connected to the inlet flange of the reservoir from which it receives the moisture laden air. The moisture laden air then flows into the membrane unit. Sweep air inclusive of water vapor that has permeated through membranes of the membrane unit flows from a sweep space defined between the vessel and the membrane unit and to the purge channel of the apparatus. The dried air flows out of the membrane unit through the outlet end of the vessel into the reservoir. The control scheme includes a purge valve and a means for controlling the purge valve. Connected to the purge flange of the reservoir, the purge valve is capable of being closed to prevent the permeate sweep air from exhausting from the apparatus into the atmosphere. When the compressor is unloaded, the means for controlling closes the purge valve and prevents the sweep air from being expelled into the atmosphere. When the compressor is loaded, the means for controlling opens the purge valve and allows the sweep air to exhaust from the sweep space into the atmosphere via the purge channel of the apparatus.

DETAILED DESCRIPTION OF THE INVENTION

Figure 1:
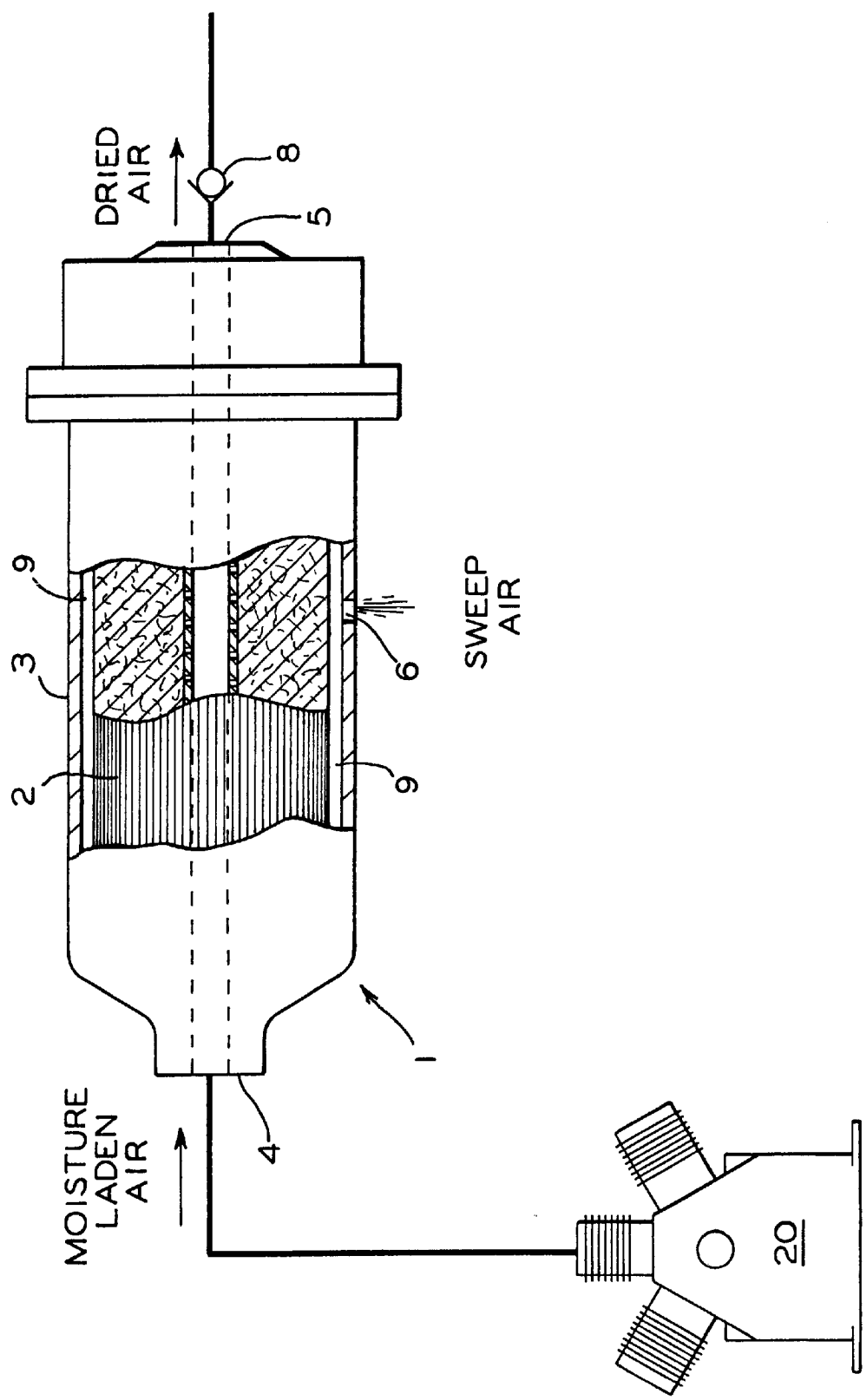
FIG. 1 is a schematic view of a membrane type gas dryer disposed within a compressed gas system.
Figure 2:
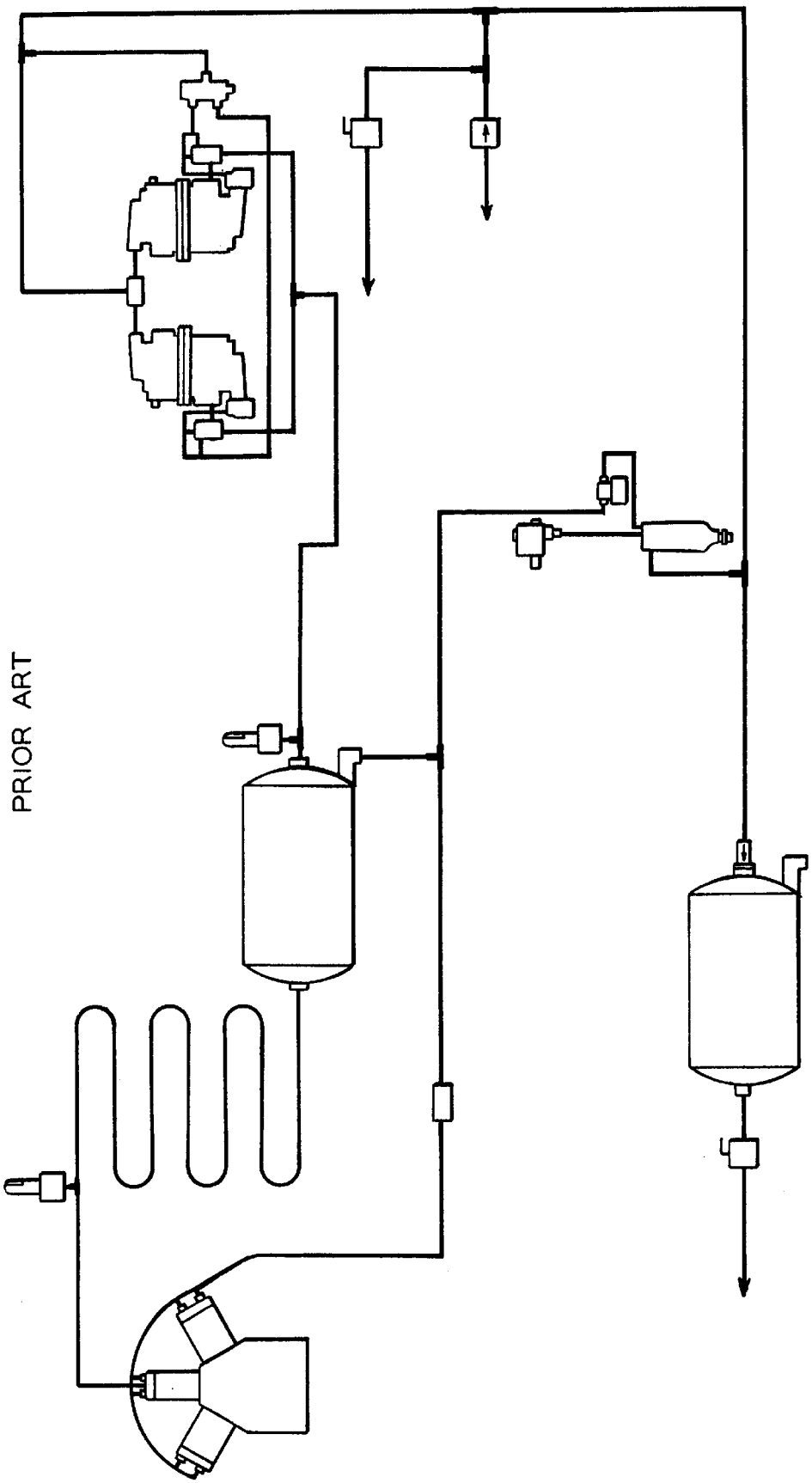
FIG. 2 is a schematic view of a main reservoir disposed within the compressed air system of a train locomotive.

Before describing the present invention in detail, the reader is advised that, for the sake of clarity and understanding, identical components having identical functions in each of the accompanying drawings have been marked where possible with the same reference numerals in each of the Figures provided in this document. Moreover, to simplify its explanation, the invention is described in the ensuing paragraphs as if incorporated into the compressed air system of a railroad locomotive. It should be apparent, however, that it could be implemented in a variety of other gas drying systems.

FIG. 1 illustrates one way in which to incorporate a membrane type air dryer within a compressed air system of a railroad locomotive. The membrane type air dryer 1 features a membrane fiber bundle 2 encased with a containment vessel 3. During the drying phase of the aforementioned duty cycle, the inlet end 4 of the membrane type air dryer 1 receives moisture-laden air from a compressor either directly or indirectly via other air drying components situated between the compressor and the membrane air dryer. Due to the incoming air stream, pressure quickly builds in the membranes of the fiber bundle 2. The sweep air leaks through the membranes carrying with it the permeate water vapor into the sweep air space 9 of vessel 3. From the purge port 6, the sweep air inclusive of the permeate water vapor is expelled into the atmosphere. From the outlet end 5 of the air dryer, dried non-permeate air is discharged to a reservoir or other suitable pneumatic components.

FIG. 1 also shows a check valve 8 connected to the outlet end 5 of the dryer. The check valve 8 prevents dried air from flowing back into the dryer when the locomotive compressed air system is in the inactive phase of its duty cycle. During this inactive phase, the pressure that had built up within the membranes of the fiber bundle 2 during the previous drying phase continues to drop because sweep air continues to leak through the membranes and into the atmosphere via purge port 6 of the sweep air containment vessel 3. As the duty cycle is typically set at thirty seconds of drying once every five minutes, the inactive phase is much longer than the drying phase of the duty cycle. The membranes of the fiber bundle 2 thus lose much, if not all, of their pressure during the inactive phase of the duty cycle. Too much of the next drying phase must then be devoted to repressurizing the membranes of the fiber bundle 2 before the membrane air dryer can again operate efficiently.

Figure 3:
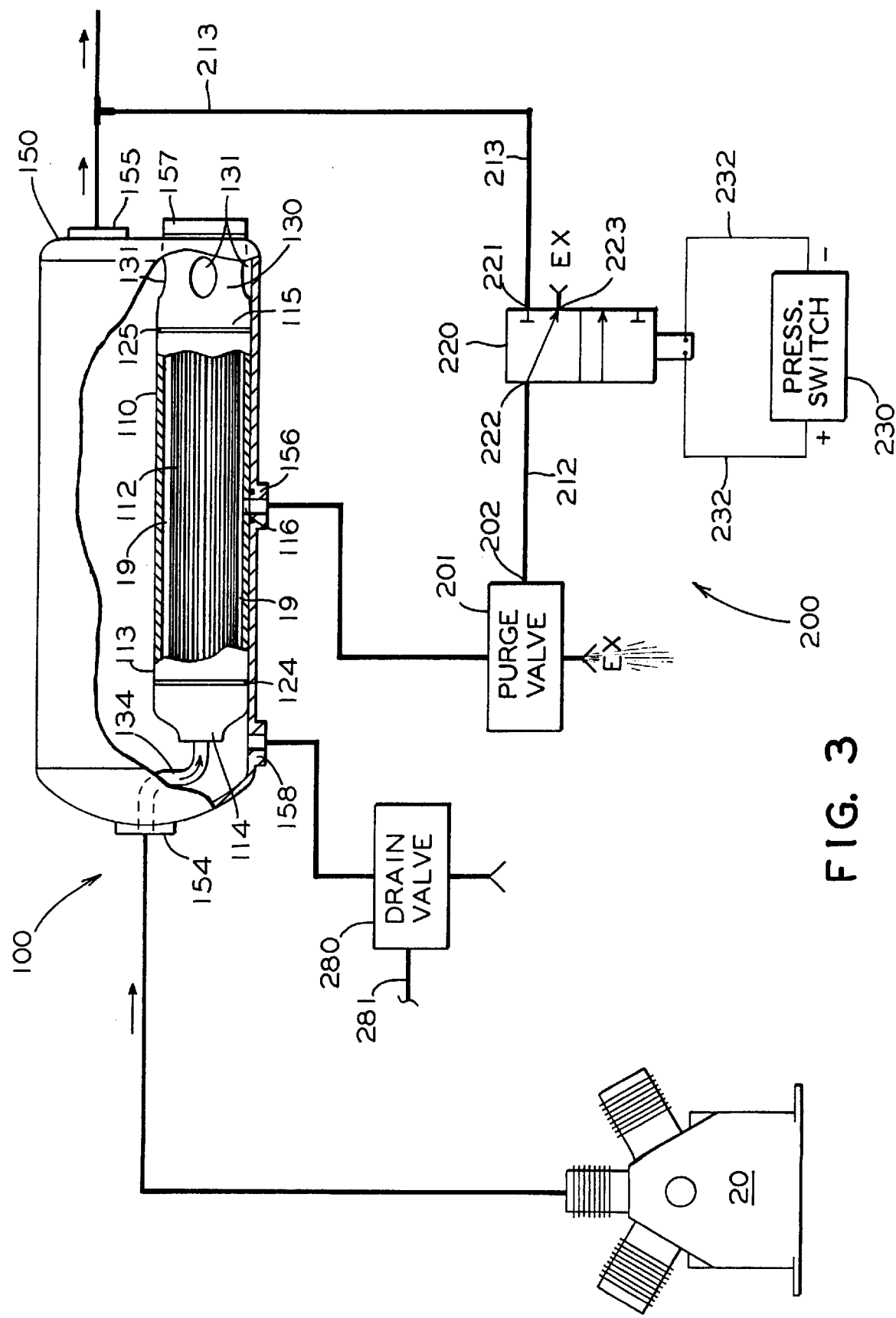
FIG. 3 is a schematic view of one embodiment of a combined gas drying and reservoir apparatus incorporating an electropneumatic control system.

Referring now to a presently preferred first embodiment of the invention, FIG. 3 illustrates a combination air drying and reservoir apparatus 100 along with the electropneumatic control system 200 to govern its operation. The combined apparatus 100 includes a membrane type air dryer 110 housed within a main reservoir 150 of a railroad locomotive. Examples of other reservoirs 150 with which the invention may be used include the auxiliary or emergency reservoirs long used in the railroad industry.

The membrane type air dryer 110 features a membrane fiber bundle 112 encased between the inlet 114 and outlet ends 115 of a containment vessel 113. As adapted for the present invention, the main reservoir 150 includes an inlet flange 154, an outlet flange 155, a purge flange 156 and a bundle flange 157. The inlet end 114 of membrane dryer 110 connects to the inlet flange 154 of reservoir 150 via a suitable conduit such as a fabricated steel tube 134. The containment vessel 113 of air dryer 110 also includes a purge port 116. The purge port 116 communicates with the purge flange 156 of reservoir 150 to form a purge channel into the atmosphere from containment vessel 113.

The membrane fiber bundle 112 is inserted into the containment vessel 113 through bundle flange 157. The fiber bundle 112 is sealed in place between the inlet and outlet ends of vessel 113 by two gaskets 124 and 125 and retaining cap 130. Each gasket is preferably made of rubber or other suitable sealing material and molded as part of its corresponding end of the fiber bundle 112. Between the outside of bundle 112 and the inner wall of vessel 113 is defined a sweep air space 19. Inlet gasket 124 seals the upstream end of bundle 112 against the inlet end of vessel 113. Outlet gasket 125 seals the downstream end of bundle 112 against retaining cap 130. Together, gaskets 124 and 125 prevent sweep air from leaking out of the sweep air space 19 into the air storage space of main reservoir 150.

Retaining cap 130 has slots 131 through which the dried air emerging from the membrane fiber bundle 112 flows into the air storage space of main reservoir 150. Retaining cap 130 also holds the fiber bundle 112 in place between the inlet and outlet ends of vessel 113. End cap 130 also serves to prevent dried air from escaping from the air storage space of reservoir 150 into the atmosphere via bundle flange 157. With end cap 130 removed, the fiber bundle 112 can be quickly removed from or inserted into the containment vessel 113.

The purge port 116 of vessel 113 and the purge flange 156 of main reservoir 150 connect to one another to form the purge channel between the sweep air space 19 and a purge valve introduced below. Preferably the purge flange 156 features a boss that is welded or otherwise connected to purge port 116 so that sweep air is unable to escape from sweep air space 19 of vessel 113 to the air storage space of main reservoir 150.

In its presently preferred first embodiment, the combined air drying and reservoir apparatus 100 features an electropneumatic control system generally designated by reference numeral 200. The control system 200 includes a gas (i.e., air) piloted purge valve 201, a magnet valve 220 and a pressure switch 230. The purge valve 201 has an inlet connected to the purge flange 156 of reservoir 150, an outlet exposed into the atmosphere and a pilot port 202. In response to a preset pressure received at pilot port 202 from interconnective pipe 212, the purge valve 201 closes communication between its inlet and outlet. When closed due to the preset pressure, the purge valve 201 prevents the permeate sweep air in sweep air space 19 from exhausting into the atmosphere via the purge channel defined by both purge port 116 of vessel 113 and purge flange 156 of reservoir 150.

Connected between interconnective pipes 212 and 213, the magnet valve 220 is a three way valve situated generally between the outlet flange 155 of reservoir 150 and the pilot port 202 of purge valve 201. Specifically, the magnet valve 220 is connected at its supply port 221 to pipe 213 from the main reservoir 150 and at its delivery port 222 to pipe 212 from the pilot port of purge valve 201. The exhaust port 223 of magnet valve 220 is open to atmosphere. Preferably controlled by pressure switch 230 or other suitable device, the magnet valve 220 may be commanded to assume either a normally closed (deenergized) state or an open (energized) state. FIG. 3 shows the magnet valve 220 in its normally closed state in which its delivery and exhaust ports 222 and 223 communicate. In its open state (not shown), the supply and delivery ports 221 and 222 communicate. The pressure switch 230 controls the magnet valve 220 by being responsive to the loading of the compressed air system of the locomotive.

Regarding its operation on a railroad locomotive, the combined apparatus 100 is preferably used in conjunction with the electropneumatic control system 200. During the drying phase of its operation, the locomotive compressor 20 is, of course, loaded. The control system 200 via its pressure switch 230 responds accordingly by deenergizing the magnet valve 220. The magnet valve responds by assuming its normally closed state in which its delivery and exhaust ports 222 and 223 communicate. This allows the pilot port 202 to vent to atmosphere through pipe 212 and the internal passageway formed in magnet valve 220 by the aligning of its delivery and exhaust ports 222 and 223. The purge valve 201 then assumes the open position as there is little or no pressure impinging on its pilot port 202.

During this drying phase, the locomotive compressor 20 drives compressed moisture laden air into inlet flange 154 through tube 134 and into fiber bundle 112 of membrane dryer 110. With the membranes of bundle 112 fully pressurized due to the incoming air, sweep air along with the water vapor it carries permeates through the membranes into the sweep air space 19 of containment vessel 113. Without pressure impinging on its pilot port, the purge valve 201 assumes the open position. This allows the permeate sweep air in the containment vessel 113 to exhaust via the purge channel and purge valve 201 into the atmosphere. Meanwhile, the dried non-permeate air that emerges from the other end of fiber bundle 112 flows through the slots 131 in retaining end cap 130 into the air storage space of main reservoir 150 of the locomotive.

When operating in the inactive phase of its operating cycle, the locomotive compressor 20 is, of course, stopped. The control system 200 via its pressure switch 230 responds accordingly by energizing the magnet valve 220 via electrical lines 232. The magnet valve 220 responds by assuming the open state in which the supply and delivery ports 221 and 222 communicate. This allows some of the dried permeate air that is stored in main reservoir 150 to flow through pipe 213, magnet valve 220 and pipe 212 to the pilot port 202 of purge valve 201. With its pilot port pressurized, the purge valve 201 assumes the closed position. Being closed, the purge valve prevents the permeate sweep air from exhausting from the containment vessel 113 via purge flange 156 into the atmosphere. The sweep air is thus retained within the containment vessel 113 when the locomotive compressor is unloaded.

Taken together, magnet valve 220 and pressure switch 230 may essentially be considered as a means to control the purge valve 201 of the present invention. It should be understood that this control means, of course, could also be implemented using various other known techniques and devices. By itself, the magnet valve 220 is a device whose construction and operation is generally well known in the air drying art. The pressure switch itself may be of the type commonly used in the field of pneumatics. For example, it is well known that compressors are often equipped with a governor—a mechanism by which to regulate automatically the operation of the compressor 20. This governor typically features a pressure switch of the type appropriate to this invention. When the compressor 20 is unloaded, the pressure switch in the governor senses the unloaded state of the compressor 20 and can provide an electrical signal that can be used to energize the magnet valve 220 of the present invention.

Figure 4:
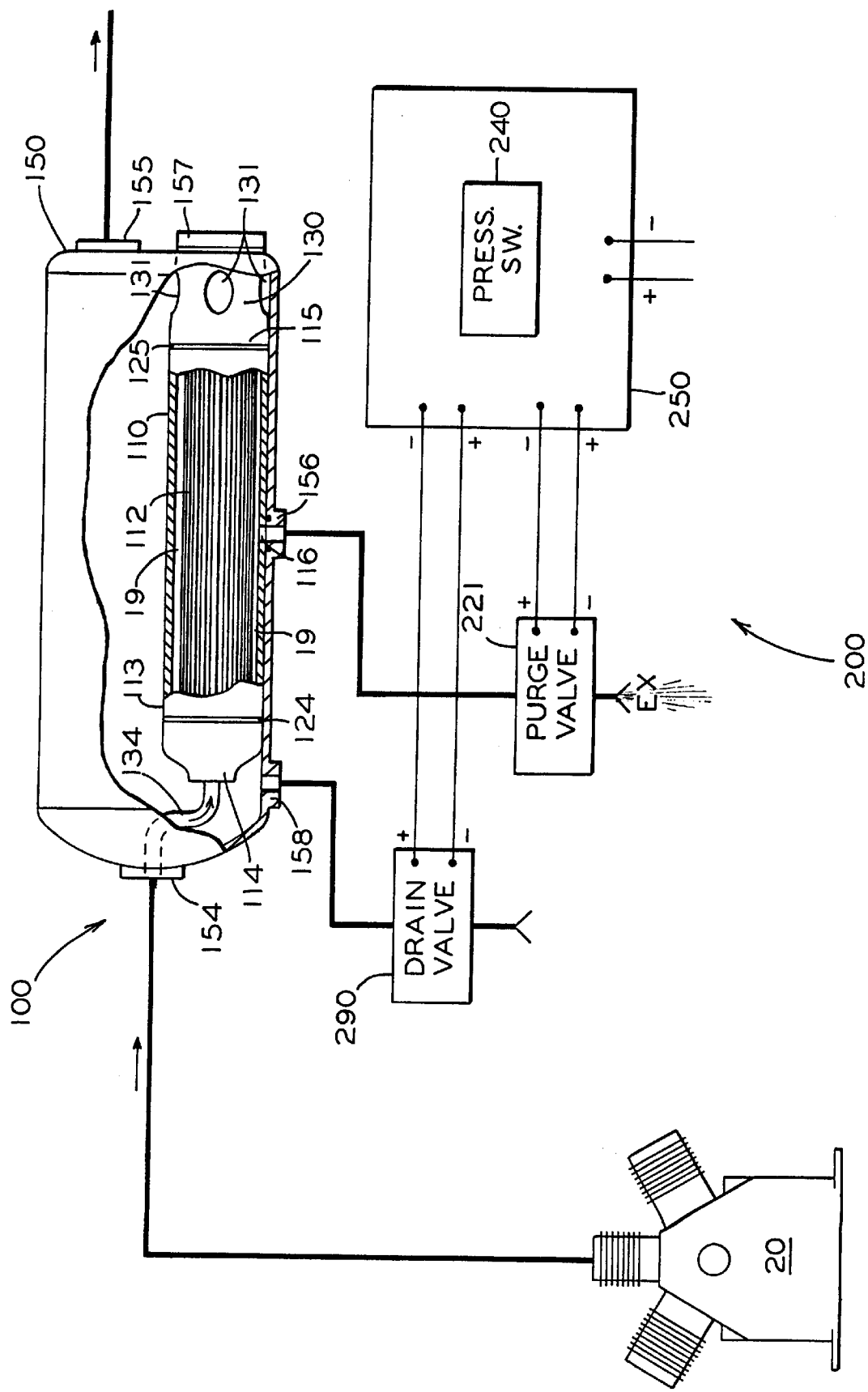
FIG. 4 is a schematic view of another embodiment of a combined gas drying and reservoir apparatus incorporating an electronic control system.

Referring now to a presently preferred second embodiment of the invention, FIG. 4 illustrates a combination air drying and reservoir apparatus 100 along with an electronic control system 200 to govern its operation. In lieu of the aforementioned air piloted purge valve 201 and its corresponding electropneumatic control means, the control system 200 may be implemented using electronically controlled devices as shown in FIG. 4. The control system 200, for example, may include a purge valve 221 that takes the form of magnet valve controlled by an electronic controller 250. The electronic controller 250 may be as simple as pressure switch 240 keyed to open (deenergize) purge valve 221 when the locomotive compressor 20 becomes loaded. The electronic controller 250, however, may be implemented using more complex circuitry and keyed to open or close purge valve 221 in response to various other criteria.

In a third embodiment, the combined air drying and reservoir apparatus 100 could be implemented without the control system 200. In this case, the sweep air space 19 would always be open to atmosphere via the purge channel defined by purge port 116 of vessel 113 and purge flange 156 of reservoir 150. During the inactive phase of operation, most, if not all, of the pressure that had built up within the membranes of the fiber bundle 112 during the previous drying phase would leak through the membrane of fiber bundle 112 and escape into the atmosphere via the purge channel of the apparatus. For this reason, this third embodiment is not a preferred embodiment of the invention.

Regarding another feature of the invention, main reservoir 150 may also include a drain flange 158 to which is connected a drain valve. Controlled so it opens periodically or according to other criteria, this drain valve would allow liquid to be drained into the atmosphere should liquid condensate somehow collect in the air storage space of the main reservoir 150. In the first embodiment, the drain valve 280 would preferably take the form of an air piloted valve whose pilot port 281 responds to pressure by opening the drain valve. Similarly, in the second embodiment, the drain valve 290 would preferably take the form of a magnet valve that responds to energization by opening the drain valve. In the third embodiment, the drain valve may be implemented in either the pneumatic or electropneumatic form.

The combined drying and reservoir apparatus 100 thus overcomes the two disadvantages inherent in the prior art ways in which membrane type air dryers have been incorporated into railroad locomotives. First, given that space is at a premium on today's technology laden locomotives, the invention incorporates the membrane dryer inside the main reservoir of the locomotive. However much volume in the reservoir is lost by doing so and is made up for by a minor increase in the diameter of the reservoir. The combined apparatus 100 thus requires a fraction of the extra space that would otherwise be required if the two devices were kept separate. Second, the first and second embodiments of the invention are each essentially endowed with a memory feature. Specifically, the control system 200 enables the membrane air dryer to resume its next drying phase generally with the same amount of internal air pressure that it had when the previous drying phase stopped. This reduces the amount of time that the compressor 20 must take to repressurize the membranes during the next drying phase. More significantly, it reduces the amount of air that the membrane dryer would otherwise lose as sweep air absent the control system.

It should be apparent that the present invention could be implemented in a variety of air drying systems and need not be confined solely to railroad industry applications. It is, however, particularly well suited for use with train locomotive compressed air systems that are to be equipped with membrane type dryers. This is because train compressed air systems are operated according to the aforementioned two phase duty cycle.

The presently preferred embodiments for carrying out the invention have been set forth in detail according to the Patent Act. Those persons of ordinary skill in the art to which this invention pertains may nevertheless recognize various alternative ways of practicing the invention without departing from the spirit and scope of the appended claims. Those of such skill will also recognize that the foregoing description is merely illustrative and not intended to limit any of the ensuing claims to any particular narrow interpretation.

Accordingly, to promote the progress of science and the useful arts, I secure for myself by Letters Patent exclusive rights to all subject matter embraced by the following claims for the time prescribed by the Patent Act.

What is claimed is:

1. A combination gas drying and reservoir apparatus for a compressed gas system, said apparatus comprising:
   (a) a reservoir for storing dried compressed gas for use by said compressed gas system, said reservoir having an inlet flange for receiving moisture laden gas ultimately from a compressor, an outlet flange for delivering said dried gas to said compressed gas system and a purge flange; and
   (b) a membrane gas dryer, disposed inside of said reservoir, for drying said moisture laden gas, said dryer including a vessel encasing a membrane unit disposed between an inlet end and an outlet end of said vessel such that (i) said moisture laden gas flows from said inlet flange through said inlet end into said membrane unit, (ii) sweep gas that has permeated through membranes of said membrane unit flows from a sweep space defined between said vessel and said membrane unit through a purge port of said vessel and through said purge flange of said reservoir with which said purge port communicates so that said permeate sweep gas expels from said apparatus into the atmosphere and (iii) said dried gas flows out of said membrane unit through said outlet end of said vessel into said reservoir.

2. The combination gas drying and reservoir apparatus as recited in claim 1 further including:
   (c) a purge valve, connected to said purge flange of said reservoir, capable of being closed so as to prevent said permeate sweep gas from exhausting from said apparatus into the atmosphere; and
   (d) a means for controlling said purge valve such that (i) when said compressor is unloaded, said means for controlling closes said purge valve and thereby prevents said permeate sweep gas from exhausting into the atmosphere and (ii) when said compressor is loaded, said means for controlling opens said purge valve thereby allowing said permeate sweep gas to exhaust into the atmosphere via said purge flange of said apparatus.

3. The combination gas drying and reservoir apparatus as recited in claim 2 wherein (i) said purge valve is gas piloted having a pilot port that responds to pressure by closing said purge valve and (ii) said means for controlling includes:
   (a) a magnet valve for interconnecting said reservoir and said pilot port of said purge valve when opened and for interconnecting said pilot port and atmosphere when closed; and
   (b) a pressure switch responsive to loading of said compressor such that (i) when said compressor is unloaded, said pressure switch energizes said magnet valve to open thereby allowing flow of said dried gas from said reservoir to pressurize said pilot port thereby closing said purge valve and preventing said permeate sweep gas from exhausting into the atmosphere and (ii) when said compressor is loaded, said pressure switch deenergizes said magnet valve to vent said pilot port into the atmosphere thereby opening said purge valve and allowing said permeate sweep gas to exhaust into the atmosphere via said purge flange of said apparatus.

4. The combination gas drying and reservoir apparatus as recited in claim 3 wherein said reservoir is any one of a main reservoir, an auxiliary reservoir and an emergency reservoir on a train.

5. The combination gas drying and reservoir apparatus as recited in claim 3 wherein:
   (a) said reservoir further includes a drain flange for enabling liquid to be drained from said reservoir; and
   (b) said apparatus further includes a drain valve, connected to said drain flange of said reservoir, capable of being controlled so as to open on a periodic basis so as to allow said liquid to be drained from said reservoir.

6. The combination gas drying and reservoir apparatus as recited in claim 5 wherein said drain valve is controlled pneumatically as said drain valve is gas piloted having a pilot port that responds to pressure by opening said drain valve.

7. The combination gas drying and reservoir apparatus as recited in claim 2 wherein:
   (a) said purge valve is a magnet valve that responds to energization by closing said purge valve; and
   (b) said means for controlling said purge valve includes a pressure switch responsive to loading of said compressor such that (i) when said compressor is unloaded, said pressure switch energizes said purge valve thereby preventing said permeate sweep gas from exhausting into the atmosphere and (ii) when said compressor is loaded, said pressure switch deenergizes said purge valve thereby allowing said permeate sweep gas to exhaust into the atmosphere via said purge flange of said apparatus.

8. The combination gas drying and reservoir apparatus as recited in claim 7 wherein said reservoir is any one of a main reservoir, an auxiliary reservoir and an emergency reservoir on a train.

9. The combination gas drying and reservoir apparatus as recited in claim 7 wherein:
   (a) said reservoir further includes a drain flange for enabling liquid to be drained from said reservoir; and
   (b) said apparatus further includes a drain valve, connected to said drain flange of said reservoir, capable of being controlled so as to open on a periodic basis so as to allow said liquid to be drained from said reservoir.

10. The combination gas drying and reservoir apparatus as recited in claim 9 wherein said drain valve is controlled electrically as said drain valve is a magnet valve that responds to energization by opening said drain valve.

11. The combination gas drying and reservoir apparatus as recited in claim 1 wherein:

(a) said reservoir further includes a drain flange for enabling liquid to be drained from said reservoir; and (b) said apparatus further includes a drain valve, connected to said drain flange of said reservoir, capable of being controlled so as to open on a periodic basis so as to allow said liquid to be drained from said reservoir.

12. A combination gas drying and reservoir apparatus for a compressed gas system, said apparatus comprising:

(a) a reservoir for storing dried compressed gas for use by said compressed gas system, said reservoir having an inlet flange for receiving moisture laden gas ultimately from a compressor, an outlet flange for delivering said dried gas to said compressed gas system and a purge flange;

(b) a membrane gas dryer disposed inside of said reservoir for drying said moisture laden gas, said membrane gas dryer having (i) an inlet end connected to said inlet flange of said reservoir to receive said moisture laden gas therefrom, (ii) an outlet end for discharging said dried gas into said reservoir and (iii) a purge port attached to said purge flange of said reservoir for enabling permeate sweep gas to be expelled from said purge flange of said apparatus;

(c) a purge valve, connected to said purge flange of said reservoir, capable of being closed so as to prevent said permeate sweep gas from exhausting from said apparatus into the atmosphere; and (d) a means for controlling said purge valve such that (i) when said compressor is unloaded, said means for controlling closes said purge valve and thereby prevents said permeate sweep gas from exhausting into the atmosphere and (ii) when said compressor is loaded, said means for controlling opens said purge valve thereby allowing said permeate sweep gas to exhaust into the atmosphere via said purge flange of said apparatus.

\* \* \* \* \*